United States Patent
Uehara

(10) Patent No.: US 8,885,091 B2
(45) Date of Patent: Nov. 11, 2014

(54) IMAGING DEVICE AND DISTANCE INFORMATION DETECTING METHOD

(75) Inventor: Hiroyasu Uehara, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 41 days.

(21) Appl. No.: 13/495,239

(22) Filed: Jun. 13, 2012

(65) Prior Publication Data

US 2012/0320230 A1    Dec. 20, 2012

(30) Foreign Application Priority Data

Jun. 14, 2011    (JP) ................................ 2011-132263

(51) Int. Cl.
H04N 5/232    (2006.01)

(52) U.S. Cl.
CPC ....... H04N 5/23212 (2013.01); H04N 5/23245 (2013.01)
USPC .......................... 348/353; 348/239; 348/222.1

(58) Field of Classification Search
CPC  H04N 5/23212; H04N 5/2356; H04N 5/2621
USPC .............. 348/239, 222.1, 354, 355, 349, 353, 348/252
See application file for complete search history.

(56) References Cited

U.S. PATENT DOCUMENTS

| 7,454,134 | B2 | 11/2008 | Sato |
| 7,538,803 | B2 | 5/2009 | Kurosawa |
| 7,683,944 | B2 | 3/2010 | Horita |
| 2008/0259154 | A1* | 10/2008 | Garrison et al. ............ 348/14.01 |
| 2009/0167928 | A1* | 7/2009 | Asukabe et al. .............. 348/345 |
| 2010/0033617 | A1* | 2/2010 | Forutanpour .................. 348/345 |
| 2011/0142287 | A1* | 6/2011 | Wong et al. ................... 382/106 |
| 2011/0279699 | A1* | 11/2011 | Matsui ....................... 348/222.1 |

FOREIGN PATENT DOCUMENTS

JP    2006-140594 A    6/2006

OTHER PUBLICATIONS

U.S. Appl. No. 13/495,229 to Hiroyasu Uehara, filed Jun. 13, 2012.

* cited by examiner

Primary Examiner — Sinh Tran
Assistant Examiner — Zhenzhen Wu
(74) Attorney, Agent, or Firm — Greenblum & Bernstein P.L.C.

(57) ABSTRACT

An imaging device is provided that comprises an imaging processor, a distance information detector, a primary image capturing processor and an image processor. The imaging processor captures a plurality of secondary images of the same object at different in-focus positions by driving a photographing lens. The distance information detector detects distance information of the object for each of the areas of an image based on the contrast in each of the areas in each of the secondary images. The primary image capturing processor captures the same image of the object as a primary image. The image processor carries out image processing on the primary image based on the distance information.

20 Claims, 13 Drawing Sheets

FIG.4
(a) 
(b) 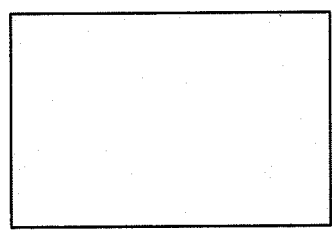
(c) 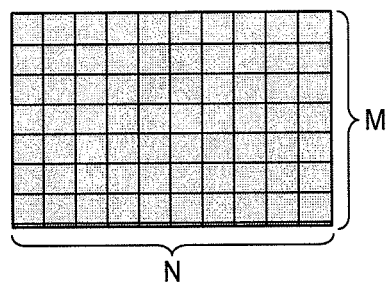
(d) 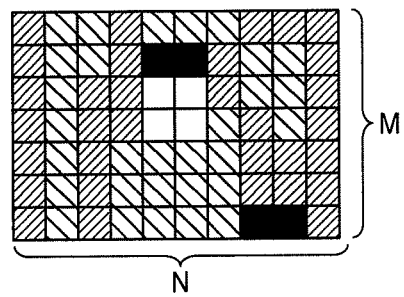
(e) 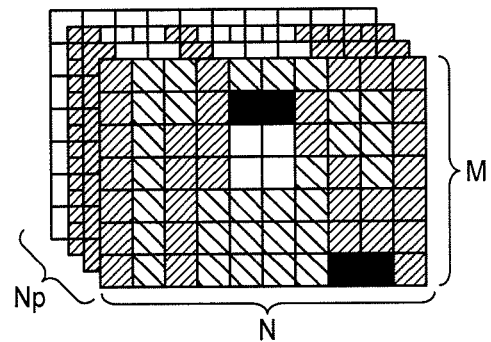

IMAGING DEVICE AND DISTANCE INFORMATION DETECTING METHOD

BACKGROUND OF THE INVENTION

1. Field of the Invention

The present invention relates to an imaging device that electronically captures an image through a lens system.

2. Description of the Related Art

In photography, a bokeh or blurring technique using an effect of the depth of field is often used to blur a background and/or foreground view that does not include the main subject, which is in focus. However, the depth of field deepens as the focal length is reduced; therefore the bokeh effect in a compact digital camera with a relatively small image sensor is ineffective because such a camera requires a short focal length.

For the above-mentioned problem, there is provided a method that determines in-focus areas and out-of-focus areas of a captured image to produce an artificial bokeh effect by applying a blurring process to the images within the out-of-focus areas. In this method, a captured image is divided into a plurality of areas and the in-focus areas and the out-of-focus areas are determined by evaluating the spatial frequencies of each area. Namely, an area with high spatial frequencies is determined to be an in-focus area and an area with low spatial frequencies is determined to be an out-of-focus area. This determination is based on the fact that the in-focus areas generally have high contrast (refer to U.S. Pat. No. 7,454,134).

SUMMARY OF THE INVENTION

However, the spatial frequencies of an image also depend upon the texture of a subject, and therefore high spatial frequencies in an image do not always mean that the image is in focus. For example, an image of a forest, a tiled roof and the like have high frequencies by nature. On the other hand, when regarding a subject such as human skin, the spatial frequencies can be lower than those of out-of-focus areas even though the image is in focus. Therefore, in order to obtain an appropriate artificial bokeh effect, the blurring process may preferably be performed on the basis of distances in the optical direction from the camera lens to objects in each of the areas that constitute the image.

Therefore, one aspect of the present invention is to provide an imaging device and method that is able to grasp distances in the optical direction to objects captured in each of the areas constituting an image.

According to the present invention, an imaging device is provided that comprises an imaging processor, a distance information detector, a primary image capturing processor and an image processor.

The imaging processor captures a plurality of secondary images of the same object at different in-focus positions by driving a photographing lens. The distance information detector detects distance information for the objects in each area of an image based on the contrast of each area in all of the secondary images. The primary image capturing processor captures the same image of the object as a primary image. The image processor carries out image processing on the primary image based on the distance information.

In another aspect of the invention, a method for detecting distance information is provided. The method involves capturing a plurality of secondary images of the same object at different lens positions by driving the photographing lens, detecting distance information of the objects in each of the areas based on the contrast in each of the areas in all of the secondary images, capturing the same image of the object as a primary image, and carrying out image processing on the primary image based on the distance information.

In another aspect of the invention, a computer readable medium having instructions for controlling a computer to execute the above method is provided.

BRIEF DESCRIPTION OF THE DRAWINGS

The objects and advantages of the present invention will be better understood from the following description with references to the accompanying drawings in which:

FIG. 4 schematically illustrates how a contrast map is created;

DESCRIPTION OF THE PREFERRED EMBODIMENTS

Figure 1:
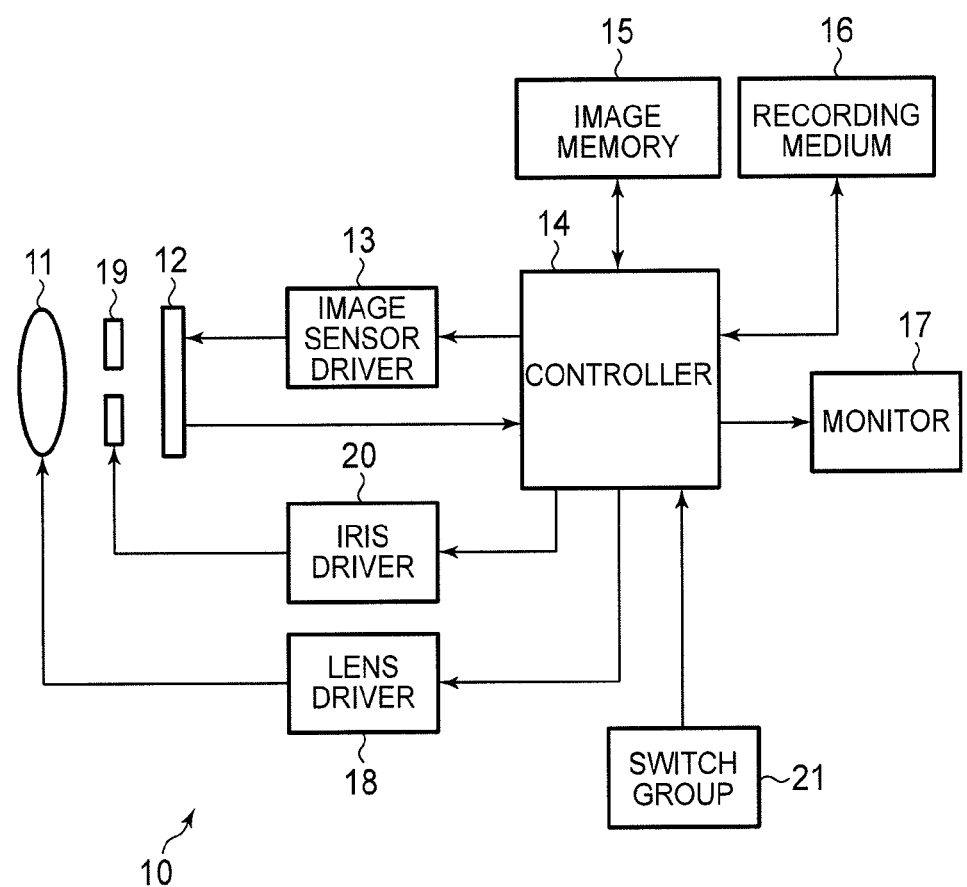
FIG. 1 is a block diagram showing the structure of a digital camera of a first embodiment.

The present invention is described below with references to the embodiments shown in the drawings.

FIG. 1 is a block diagram schematically illustrating the general structure of a digital camera to which a first embodiment of the present invention is applied. Although the digital camera also applies to a camera unit implemented in various miniature electronic devices including a compact camera, a cellular phone and the like, the first embodiment will be explained for a compact camera, as an example.

In the digital camera 10, an object image produced through a photographing lens 11 is captured by an image sensor 12. The image sensor 12 is driven by an image sensor driver 13 that is controlled according to instructions from a controller 14. An image captured by the image sensor 12 is fed to the controller 14 and subjected to various types of digital image processing, and then temporarily stored in an image memory 15. The image stored in the image memory 15 may further be recorded in a recording medium 16 when desired by a user. An image captured by the image sensor 12 or stored in either the image memory 15 or the recording medium 16 may be displayed on a monitor 17, e.g. an LCD or the like.

The photographing lens 11 is driven by a lens driver 18, and an iris 19 is driven by an iris driver 20. Contrast detection autofocus is employed so that the controller 14 controls the lens driver 18 with reference to the contrast of an image captured by the image sensor 12 and controls the iris driver 20 in accordance with a photometric value. Further, the digital camera 10 is provided with a switch group 21 that includes a release switch, photometric switch, dial switch for selecting either functions or modes, four-way controller switches, and so on, where each of the switches is connected to the controller 14.

Figure 2:
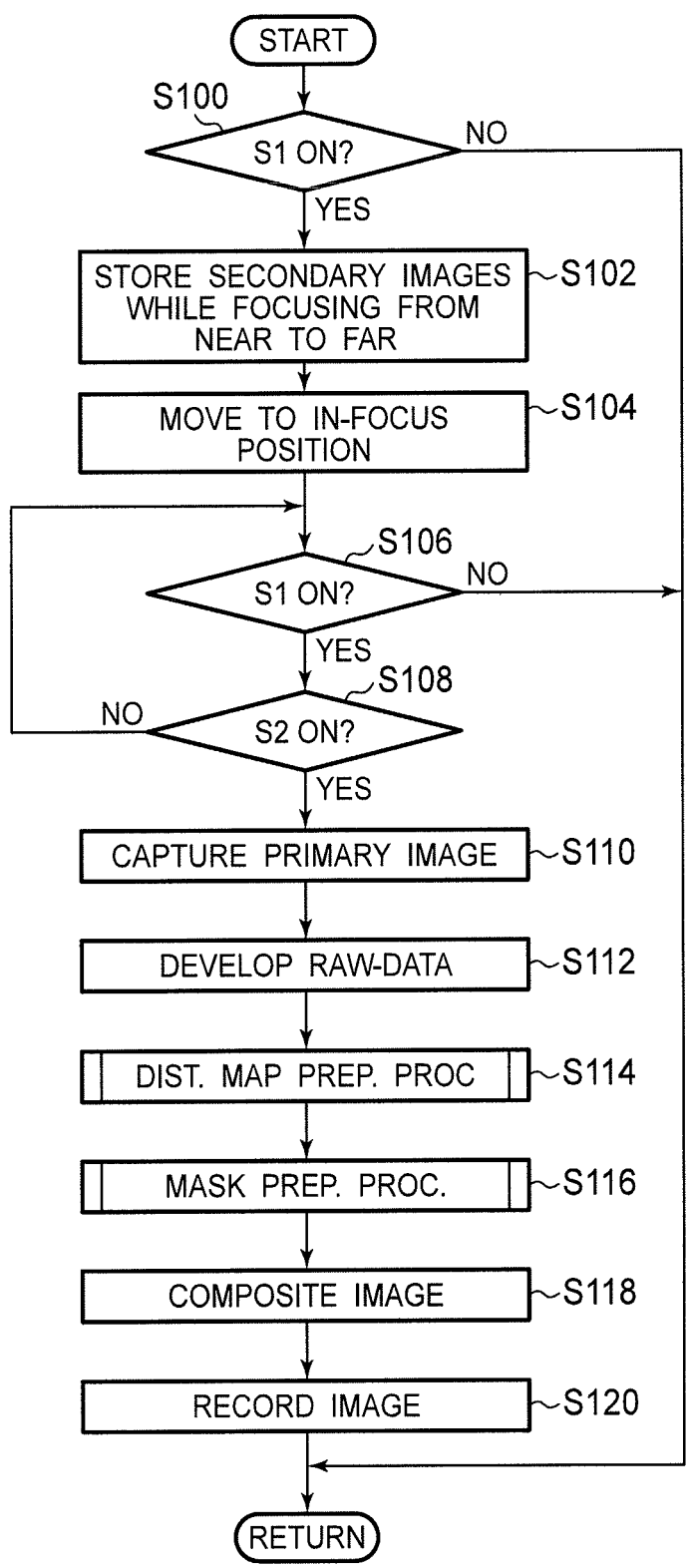
FIG. 2 is a flowchart of interrupt processing repeatedly carried out in a bokeh control mode.

With reference to FIG. 1 and the flowchart of FIG. 2, a bokeh or blur control process of the first embodiment will be explained. The flowchart of FIG. 2 represents interrupt processing repeatedly carried out by the controller 14 when a bokeh control mode is selected. Note that the bokeh control mode is selected by a user operating a predetermined switch.

In Step S100, whether the release button (not shown) is half depressed and the photometric switch S1 is in the ON state is determined. When it is determined that the photometric switch S1 is not in the ON state, in other words when the release button has not been half depressed, interrupt processing is immediately terminated and reexecuted after other processes are carried out. However, when it is determined that the photometric switch S1 is in the ON position in Step S100, the lens driver 18 drives the photographing lens 11 and moves the in-focus distance from the closest distance to the furthest distance (e.g., infinity) by a predetermined number of steps to set the lens in a plurality of positions. At each position, one image is captured so that Np (Np: number of positions) through-the-lens images (secondary images) are stored in the image memory 15. Note that the process in Step S102 is carried out in short time so that Np images captured during this process can be regarded as shots of the same object taken from the same position, in the same direction and at the same angle of view, but focusing on different distances.

In Step S104, the photographing lens 11 is moved to the in-focus position by the lens driver 18 using the well-known contrast detection autofocus. In Step S106, whether or not the photometric switch is in the ON state, namely whether or not the half-depressed position of the release button (not shown) has been maintained, is determined. If it is not maintained, interrupt processing is terminated and repeated after the other processes are carried out.

When the ON state of the photometric switch S1 is maintained, whether or not the release switch S2 is in the ON state is determined in Step S108. If the release switch S2 has not been turned on, the process returns to Step 106 and the same determinations are repeated. On the other hand, when the release switch S2 is in the ON state, the image capturing operation for capturing a recording image (a primary image), which is the image to be recorded, is carried out by the image sensor 12 in Step S110. Further, in Step S112, a developing process is applied to the RAW data of the recording image. Note that the recording image, which is captured in Step S110, is also regarded as an image of the same object shot from the same position in the same direction and at the same angle of view as the Np images captured in Step S102.

In Step S114, a distance map preparation process that uses the through-the-lens images (secondary images) stored in the image memory 15 in Step S102 is carried out. The distance map is a map of data that assigns distance information for the objects in each area (block) constituting the recording image (or the through-the-lens image). The details of the map preparation process will be discussed later.

In Step S116, a mask preparation process (detailed later) that prepares a mask for applying the blur control process to all areas other than the main subject area of the recording image (primary image) is carried out with reference to the distance map prepared in Step S114. In Step S118, the bokeh control process is applied to the recording image that has already been masked so that a new composite recording image (a new composite primary image) is produced. The new composite recording image is recorded in the recording medium 16 in Step S120, which ends this interrupt processing in the bokeh control mode.

Note that the recording image (primary image) may be recorded without performing the bokeh control processing and may be configured to be recorded with the corresponding distance map in the recording medium 16 so that the bokeh control processing or other image processing may be carried out later with reference to the distance map. In such a case, the recording image (primary image) data and the distance map data may be stored in separate files or kept together in the same file. When they are stored in separate files, the correspondence between separate files may use the file names or information recorded in header files.

Figure 3A:
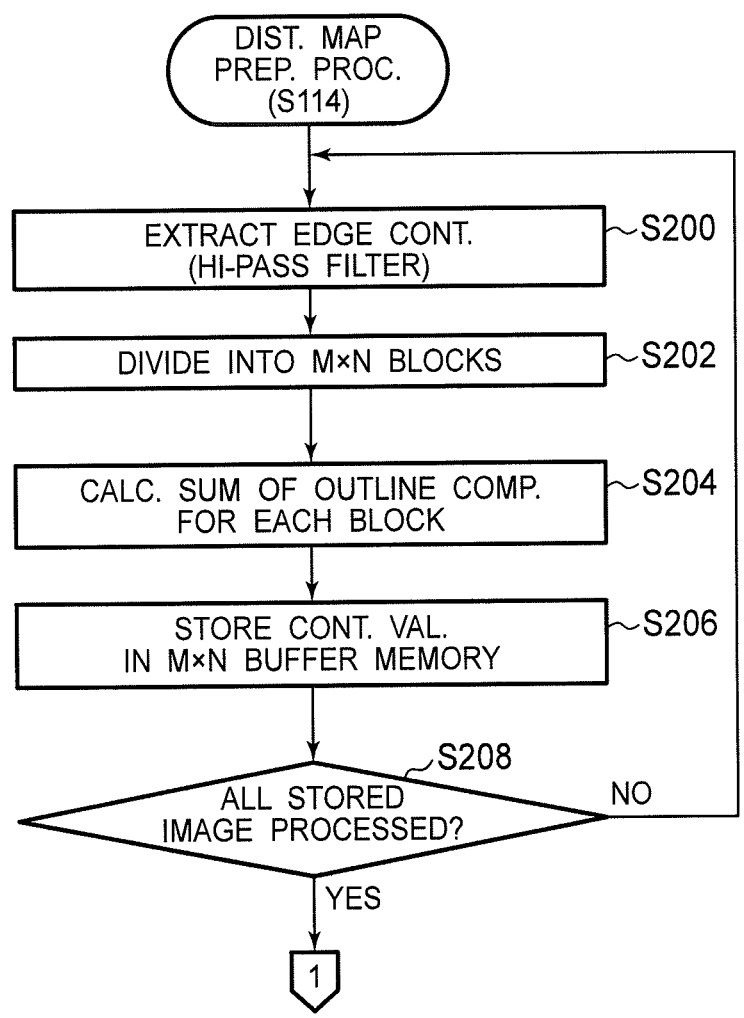
FIGS. 3A and 3B are the flowcharts of a distance map preparation process.
Figure 3B:
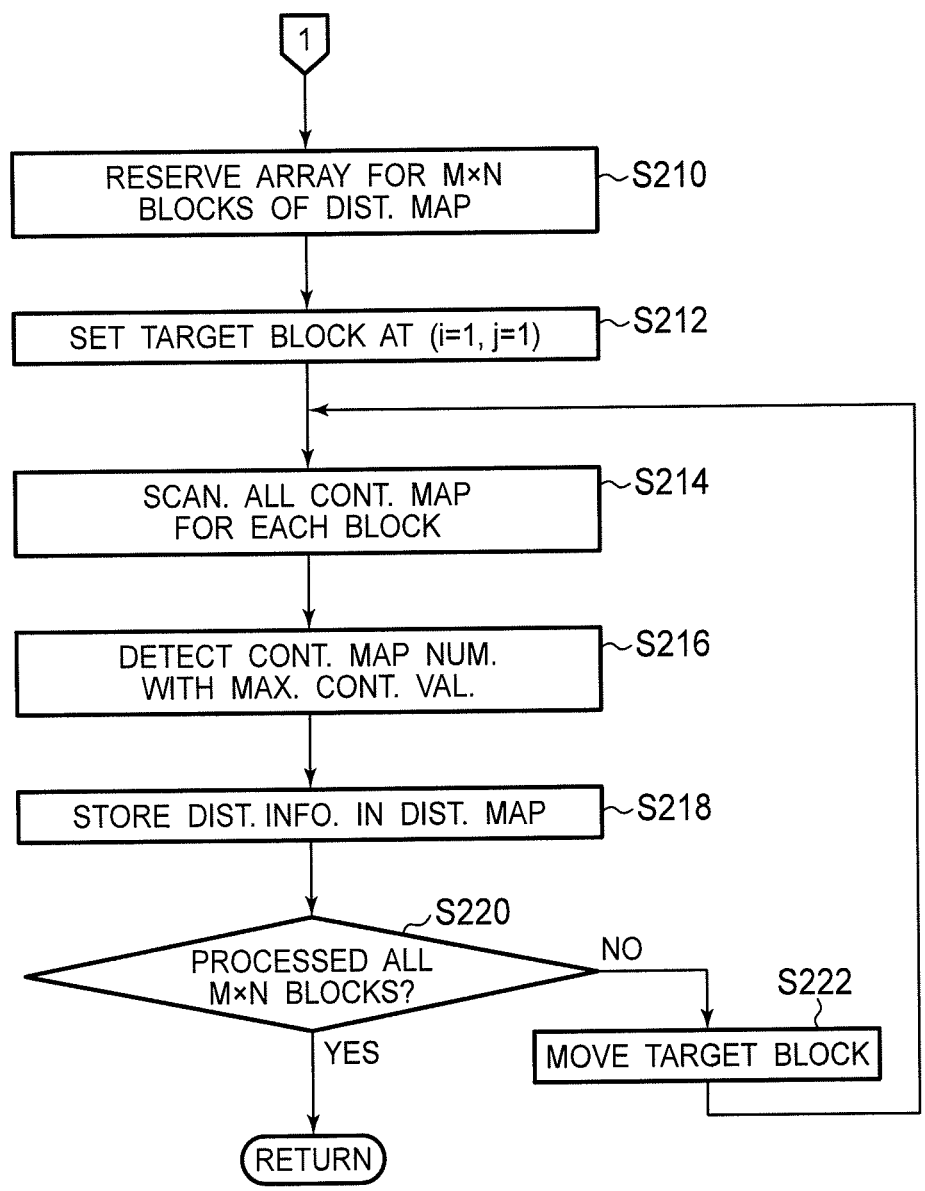

FIGS. 3A and 3B are flowcharts of the distance map preparation process, which takes place in Step S114 of FIG. 2. Further, FIGS. 5-8 represent processes that are carried out in FIGS. 3 and 4. With reference to FIGS. 3-8, the distance map preparation process of the first embodiment will be explained.

In the distance map preparation process, outline or edge contour components are extracted or enhanced in Step S200 by applying an edge contour extraction process, which may include a high pass filter and a differential filter, to each of the through-the-lens images (secondary images) stored in the image memory 15 (the images stored in Step S102 of FIG. 2). Here, FIG. 4(a) represents an example of a through-the-lens image in which the outline (edge contour) components have not been extracted. FIG. 4(b) represents an example of the through-the-lens image after applying the edge contour extracting process to the image illustrated in FIG. 4(a).

In Step S202, as illustrated in FIG. 4(c) as an example, the image (FIG. 4(b)) from which the outline (edge contour) components have been extracted is divided into M*N blocks (areas). Here, N denotes the number of the blocks in the vertical direction and thus is smaller than the number of pixels in the vertical direction of the through-the-lens image (secondary image). Further, M denotes the number of the blocks in the horizontal direction and thus is smaller than the number of pixels in the horizontal direction of the through-the-lens image. Note that in the first embodiment a singular pixel may also constitute a block.

In Step S204, the sum of the outline (edge contour) components is calculated for each block. Namely, the sum of the pixel values within each block is calculated as a contrast value (a value used to evaluate the degree of contrast) for the image (FIG. 4(b)) from which the outline components has been extracted. In Step S206, the contrast values calculated for each block are stored in an M*N-sized buffer memory (not shown) as a contrast map (a map for evaluating the degree of contrast) for each of the through-the-lens images (secondary images). FIG. 4(d) schematically illustrates an example of the contrast map corresponding to the blocks shown in FIG. 4(c). In FIG. 4(d), a brighter block represents a higher contrast value.

In Step S208, whether the above-mentioned process (S200-S206) has been applied to all of the Np through-the-lens images (secondary images), which are stored in the image memory 15, is determined. When it is determined that the above-mentioned process has not been conducted for all of the through-the lens images, the process returns to Step S200 and the process of Steps S200-S206 is carried out for the through-the-lens images that have not been processed.

On the other hand, when it is determined in Step S208 that the process of Steps S200-S206 has been conducted for all of the Np through-the-lens images stored in the image memory 15, the process proceeds to Step S210 and Np contrast maps for Np through-the-lens images are stored in the buffer memory, as illustrated in FIG. 4(e).

Figure 5:
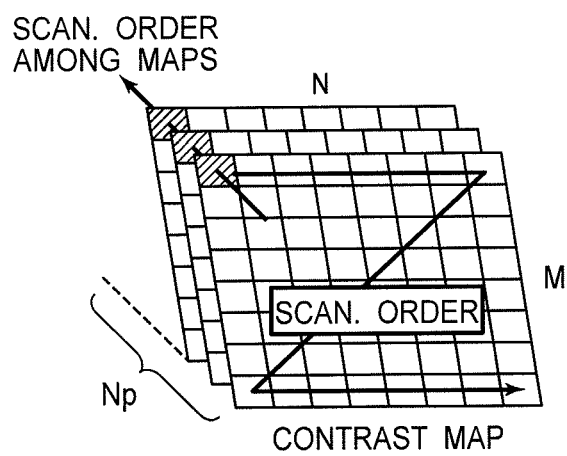
FIG. 5 schematically illustrates how contrast values are scanned from contrast maps.

As schematically illustrated in FIG. 5, the distance map is obtained by referring to every Np contrast map for each of the blocks. In Step S210, an array for M*N blocks is reserved in a memory to preserve the distance map. In Step S212, the initial target block among the M*N blocks, which will be subjected to the distance detection process, is set.

For example, when the positions of M*N blocks in each of the Np contrast maps are identified by coordinates (i, j), where "i" denotes the i-th row and "j" denotes the j-th column with respect to the upper left position of the map in FIG. 5 as the origin, the distance detection process starts from the block with coordinates i=1 and j=1. Note that in this procedure, the target block is primarily moved from left to right in the same row, then to the next row and so on until it reaches the last block.

Figure 6:
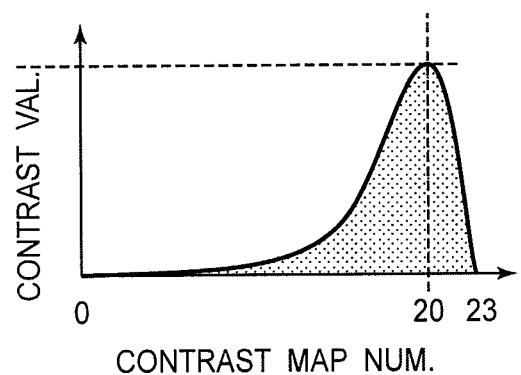
FIG. 6 schematically illustrates the relationship between a contrast map number and a contrast value.

In Step S214, the contrast value for each corresponding target block (i, j) among all of the Np contrast maps is scanned and a contrast map with the maximum contrast values for each particular (i, j) target block is identified so that the identification numbers of the contrast map can be obtained. For example, when there are 23 contrast maps (Np=23) and the contrast value of the target block (i, j) varies with respect to the contrast maps as indicated in FIG. 6, the maximum contrast value for target block (i, j) is detected on the contrast map with identification number "20".

In Step S218, the identification number of the contrast map that is detected in Step S216 is stored in an element of the array reserved in Step S210 that corresponds to the same (i, j) target block of the distance map. In Step S220, whether or not the distance information detection process has been performed for all of the M*N blocks is determined. Namely, whether or not an identification number designating whichever contrast map has the maximum contrast value for a particular (i, j) target block has been detected for all of the M*N blocks and preserved in each corresponding array element is determined. When the above detection and preservation for all of the M*N blocks has not been completed, the target is moved to the next block in Step S222 and the process from Step S214 is repeated. Further, when it is determined that the detection and preservation for all of the M*N blocks has been completed, the distance map preparation process ends.

Upon completion of the distance map preparation process, the identification number of whichever contrast map has the highest contrast value for a particular block is preserved in the array element of each corresponding block in the distance map. Namely, the number assigned to each block represents the in-focus lens position for that particular block area, and it may also correspond to the distance in the optical direction from the lens to the object captured in that particular block of the image. In the example of a distance map shown in FIG. 7, the distance to the subject increases as the contrast map number increases, and with reference to FIG. 4(a), the blocks with the contrast map number "8" correspond to a person, i.e., the main subject. Further, the blocks with the contrast map number "20" correspond to a distant view, such as the far-off background, while the blocks with the contrast map number "13" correspond to objects that exist between the main subject and the background, for example trees just behind the person who is the main subject.

With reference to the flowchart of FIG. 8 and FIGS. 9-11, the mask preparation process of the first embodiment, which is carried out in Step S116 of FIG. 2, will be explained.

When the mask preparation process is started, the main subject is selected in Step S300. The main subject may be designated by a focus point used in the AF operation during image capturing, or it may be designated from the image by a user using a suitable input device. It may also be designated by a position detected with face detection technology. For example, any block may be determined to be part of the main subject if the difference (or distance) between its contrast map number and the contrast map number (or position) of the block containing the pre-determined main subject is less than or equal to a certain range (or distance).

In Step S302, a mask to exclude the acknowledged main subject blocks from the bokeh control process is generated and the image captured in Step S110 of FIG. 2 is subjected to the masking process. Note that the corresponding blocks in a through-the-lens image (secondary image) and recording image (primary image) are instantly recognized from the number of pixels in each of the images.

Figures 7, 8:
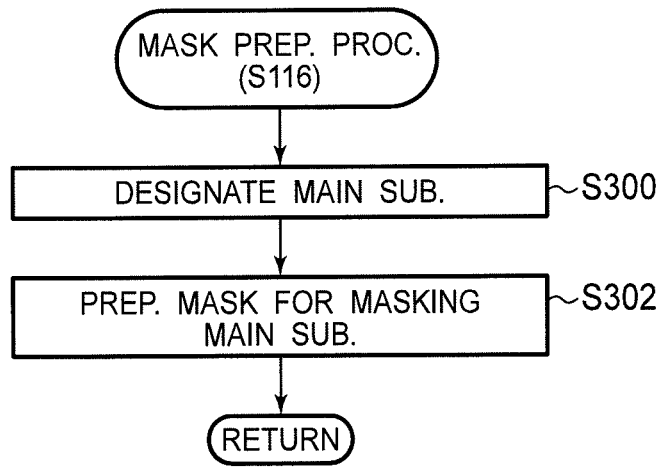
FIG. 7 is an example of a conceptual schematic of a distance map.
FIG. 8 is a flowchart of a mask-preparation process of the first embodiment.
Figure 9:
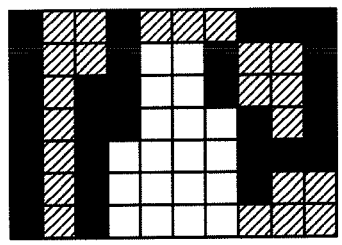
FIG. 9 is an example of the mask when the contrast map number "8" in FIG. 7 is designated as the main subject.

FIG. 9 illustrates an example of the mask when the blocks with contrast map identification number "8" (a person) in FIG. 7 are designated as the main subject. Further, FIG. 10 illustrates an example of the mask when the contrast map identification number "13", which corresponds to an intermediate distance, is designated as the main subject, and FIG. 11 is an example when the contrast map identification number "20", which corresponds to a distant view, is designated as the main subject.

Figure 10:
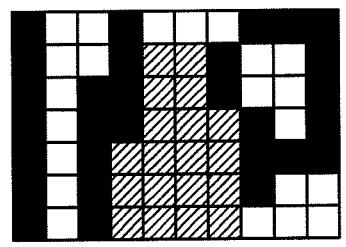
FIG. 10 is an example of the mask when the contrast map number "13" in FIG. 7 is designated as the main subject.
Figure 11:
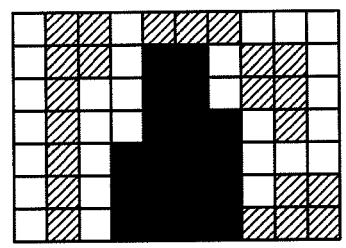
FIG. 11 is an example when the contrast map number "20" in FIG. 7 is designated as the main subject.

Note that in the first embodiment alpha compositing may be used in the masking process so that brighter blocks in FIGS. 9-11 are subjected to weaker blurring and darker blocks are subjected to stronger blurring.

As described above, according to the first embodiment an appropriate bokeh may be applied to areas other than the main subject, even in a situation where a bokeh effect cannot be sufficiently obtained using the depth of field. Further, in the present embodiment the contrast is evaluated using an edge contour extraction process to facilitate and optimize the in-focus evaluation. Further, by dividing an image into a plurality of blocks (except for blocks comprising a single pixel), the processing speed is improved. In the present embodiment, a plurality of through-the-lens images (secondary image) is used in preparing the distance map so that the processing speed can be further improved.

Further, since though-the-lens images are used in the present embodiment, a user may not be aware of or bothered by the bokeh control processing, compared to when it is carried out exclusively by capturing a plurality of images to obtain the distance map.

Figure 12:
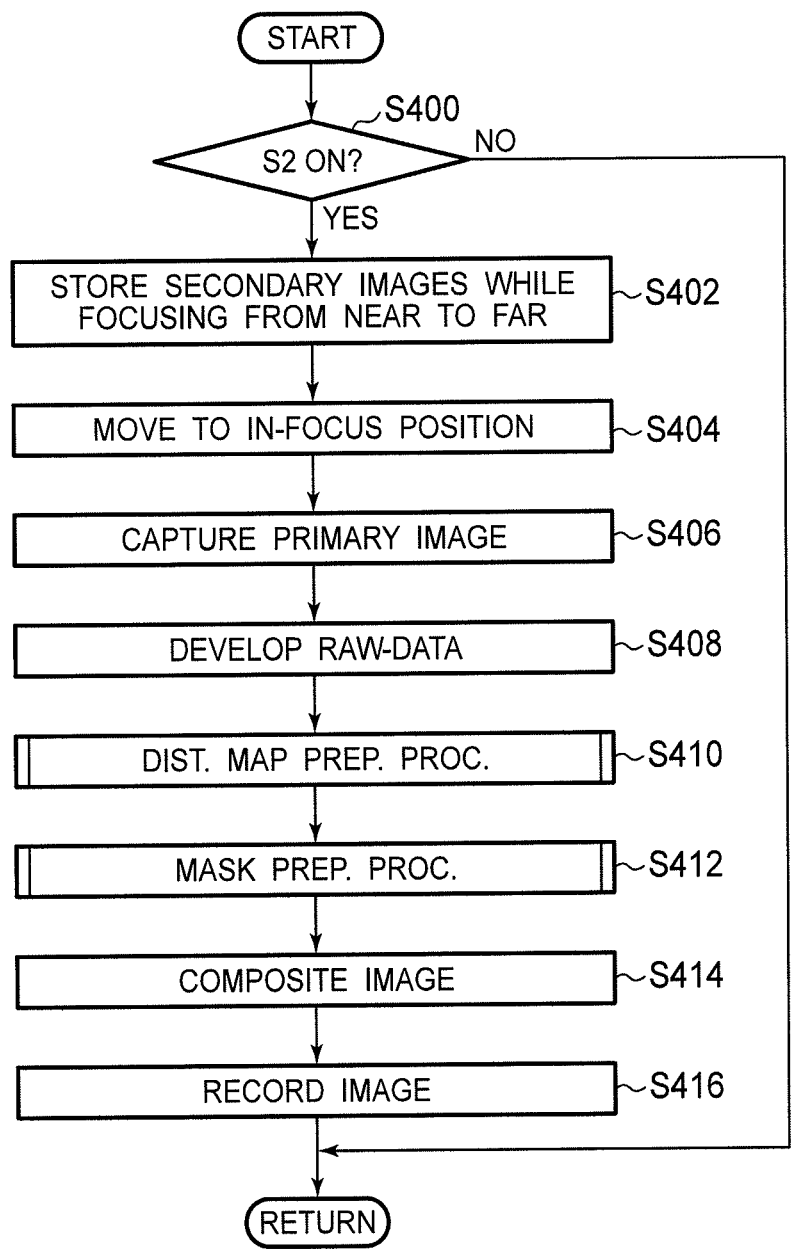
FIG. 12 is a flowchart of interrupt processing carried out in a bokeh control mode of an alternative embodiment.

Incidentally, although the present embodiment is explained with the compact camera as an example, a flowchart that may be applied to an alternative embodiment, including a camera unit provided in a cellular phone, is shown in FIG. 12. Here, FIG. 12 corresponds to the flowchart of FIG. 2 in the first embodiment. The substantial difference between this alternative embodiment and the first embodiment is that this camera unit does not have a photometric switch S1. Namely, the photometric operation, autofocus operation and image capturing operation are started only when the release button is fully depressed, in other words when the release switch is turned on. Therefore, the flowchart of the alternative embodiment does not have steps corresponding to Steps S106 and S108 of FIG. 2, and Step S100 is replaced by Step S400 that determines whether or not the release switch S2 is in the ON state. Note that Steps S402 and S404 correspond to Steps S102 and S104, and Steps S406-S416 correspond to Steps S110-120, respectively.

As described above, the same effect or advantage of the first embodiment can be obtained for a camera unit mounted on a cellular phone and the like, in which the photometric switch is turned on only when the release button is fully depressed.

With reference to FIGS. 13-20, a digital camera of a second embodiment will be explained. The features of the digital camera in the second embodiment are the same as those in the first embodiment except for the masking method (Step S116 in FIG. 5). In the second embodiment, the masking method is changed according to the distance from the lens to the main subject in the optical direction. Therefore, in the following descriptions only features dissimilar to the first embodiment will be explained, which corresponds to Step S116 of FIG. 2.

The depth of field deepens as the distance to a photographing object increases, and the resolving power in a one-step drive motion (the minimum displacement) of an AF operation is reduced as the distance increases. Therefore, in the second embodiment, the bokeh control process is changed in accordance with the distance from the lens to the main subject in the optical direction. In the present embodiment, a bokeh control process that emulates subtle differences caused by depth is selected when the main subject is relatively nearby (a near-distance mode). On the other hand, a bokeh process that blurs only the background of the main subject in order to enhance the contrast between the main subject and the background is selected when the main subject is relatively far away (a far-distance mode).

Figure 13:
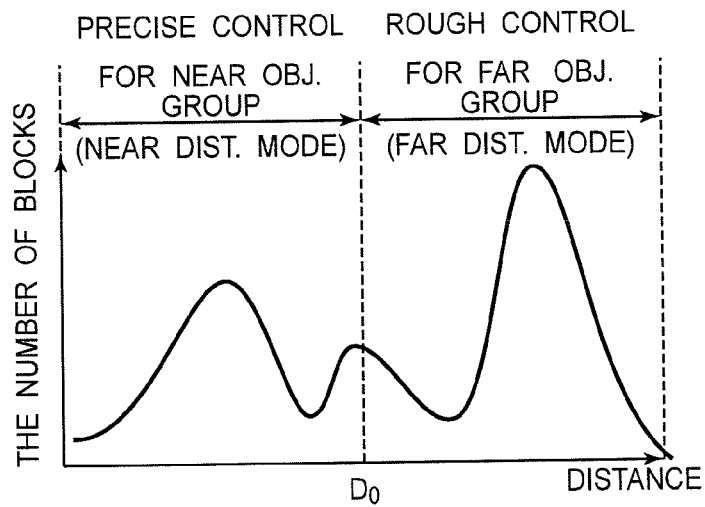
FIG. 13 schematically illustrates an example of a histogram describing the frequencies of the blocks assigned to each distance.

FIG. 13 schematically illustrates an example of a histogram in which the horizontal axis represents the distance to the object and the vertical axis represents the frequency of the blocks assigned to each distance. In the present embodiment, either the above-mentioned near-distance mode or far-distance mode is selected according to whether or not the main subject is closer than a predetermined distance "$D_o$". Namely, when the distance to the main subject is "$D_o$" or less, the near-distance mode is selected, otherwise the far distance mode is employed.

Note that the depth of field also depends on the f-number, thus the distance "$D_o$" may be changed according to the f-number. For example, the depth of field becomes relatively shallower as the f-number is reduced, so that the distance "$D_o$" may be set to a greater value as the f-number is reduced and to a lesser value as the f-number is increased.

Figure 14:
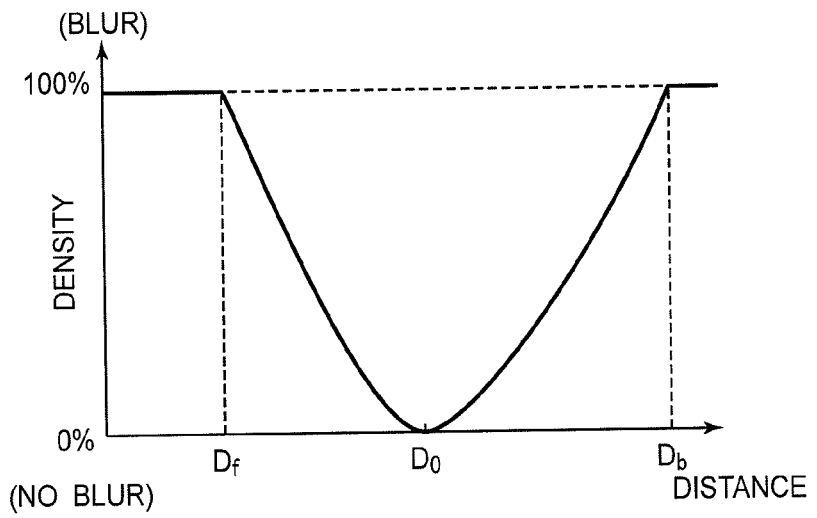
FIG. 14 indicates the variation in the blur intensity of the bokeh control process in the near-distance mode.

FIG. 14 indicates variation in the blur intensity of the bokeh control process in the near-distance mode. Namely, the curves in FIG. 14 define the mask density in the near-distance mode. In the near-distance mode, a block corresponding to the distance of the main subject is not blurred or subjected to the minimum blurring. As for blocks corresponding to the foreground view or background view, the intensity of blurring is gradually enhanced as the distance of the blocks increases with respect to the distance "$D_o$" of the main subject. For example, the blurring intensity is gradually increased up to the maximum (100%) until it reaches the distance "$D_f$" in the foreground view or "$D_b$" in the background view.

Figure 15:
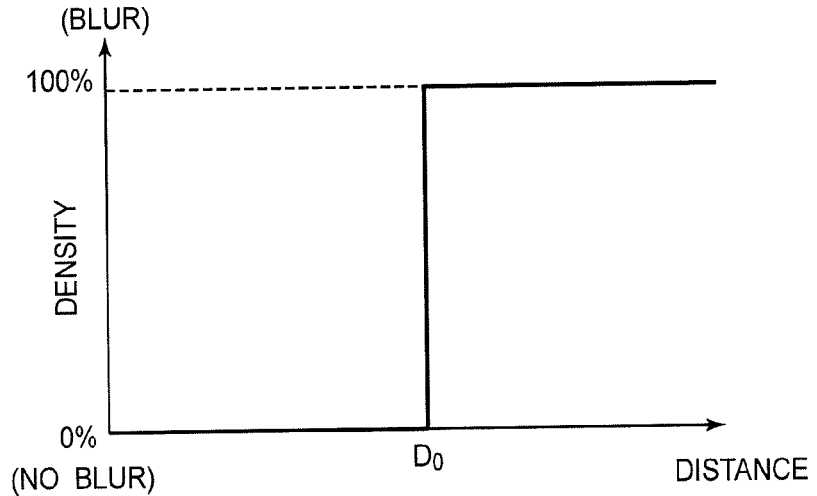
FIG. 15 indicates the variation in the blur intensity of the bokeh control process in the far-distance mode.

FIG. 15 indicates variation in the blur intensity of the bokeh control process in the far-distance mode. Namely, curves in FIG. 15 define the mask density in the far-distance mode. In the far-distance mode, as discussed above, block areas in the background view are only blurred to enhance the contrast between the main subject and the background view, so that the blurring is accomplished in a step function manner with the distance "$D_o$" of the main subject as the threshold. Namely, the blocks corresponding to distances closer than the main subject (distance "$D_o$") are not blurred while all of the blocks corresponding to distances farther than the main subject (distance "$D_o$") are subjected to the maximum blurring (100%).

In the present embodiment, the mask density curves defined in each of the modes may be controllable by operating the four-way controller switches or the electronic dial switch in the switch group 21 of FIG. 1. For example, in the near-distance mode the depth of field may be controllable. Namely, the position of "$D_f$" and "$D_b$" in FIG. 14 may be varied by a one-step unit in the AF operation. Further, in the far-distance mode the intensity of blurring may be variable.

Figure 16:
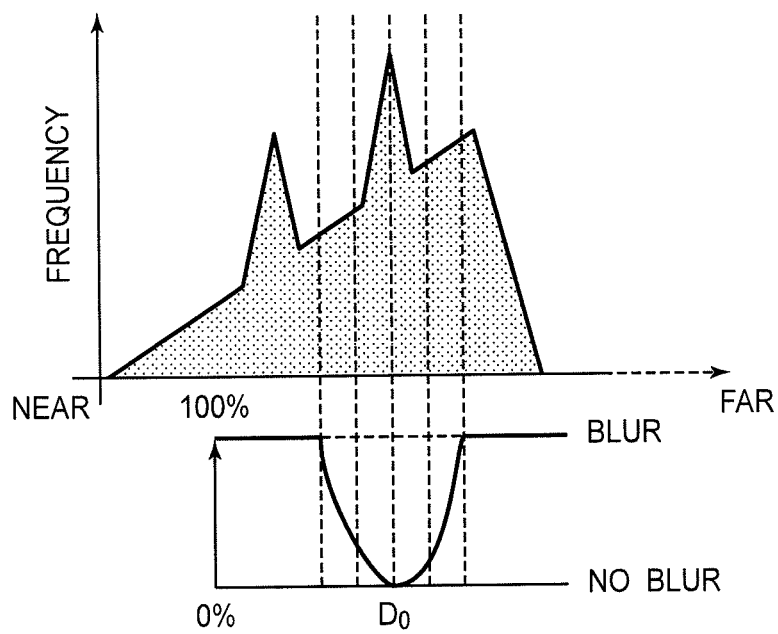
FIG. 16 schematically illustrates the relationship between the histogram and the bokeh control process in the near-distance mode.
Figure 17:
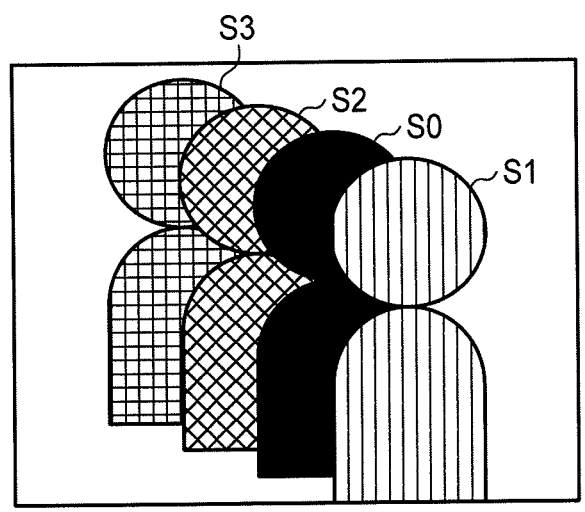
FIG. 17 schematically illustrates an example of an image captured in the near-distance mode.

FIG. 16 schematically illustrates an example of the relationship between the histogram (distance/frequency (the number of blocks) based) and the bokeh control process in the near-distance mode. In FIG. 16, the broken lines represent the variation in the resolving power of the depth depending on the distance. Further, FIG. 17 schematically illustrates an example of an image captured in the near-distance mode. Assuming a person S0 is the main subject, persons S1-S3, who are in front and behind the person S0, are blurred at various degrees depending on their depth-wise distance from the person S0. Namely, in the present embodiment, the degree of blurring increases for objects as their distance from the main subject increases, so that a detailed difference in the depth is enhanced and the solidity is increased compared to the original image.

Figure 18:
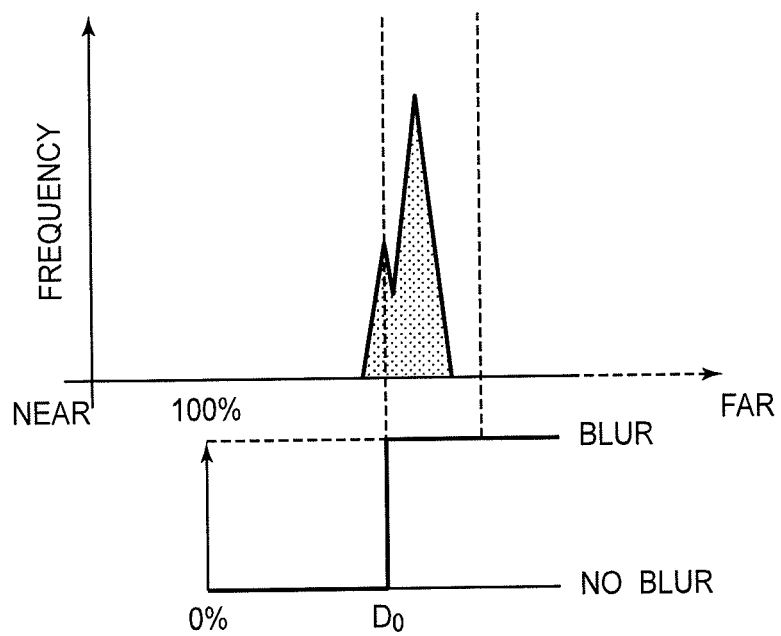
FIG. 18 schematically illustrates the relationship between the histogram and the bokeh control process in the far-distance mode.
Figure 19:
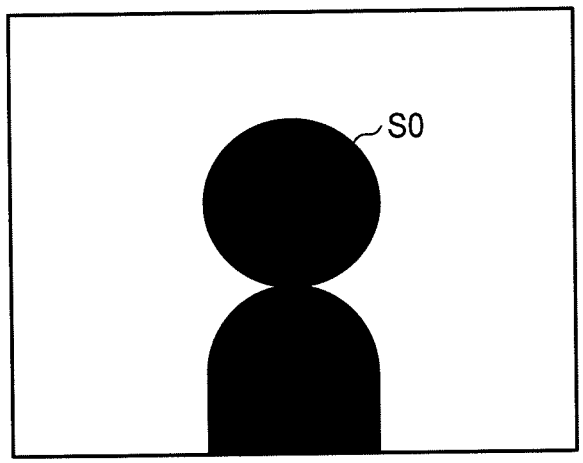
FIG. 19 schematically illustrates an example of an image captured in the far-distance mode.

On the other hand, FIG. 18 schematically illustrates an example of the relationship between the histogram (distance/frequency (the number of blocks) based) and the bokeh control process in the far-distance mode. Similar to FIG. 16, the broken lines represent the variation of the resolving power of the depth depending on the distance. Further, FIG. 19 schematically illustrates an example of an image captured in the far-distance mode. In FIG. 19, the blurring process is not carried out on the blocks that are determined to have distances that are equal or less than the distance to the main subject (the person S0), while uniform strong blurring is applied to the blocks that are determined to have distances greater than the distance of person S0. Thereby, an image is obtained in which only the main subject, the person S0, is held clear while the rest of the view is blurred.

Figure 20:
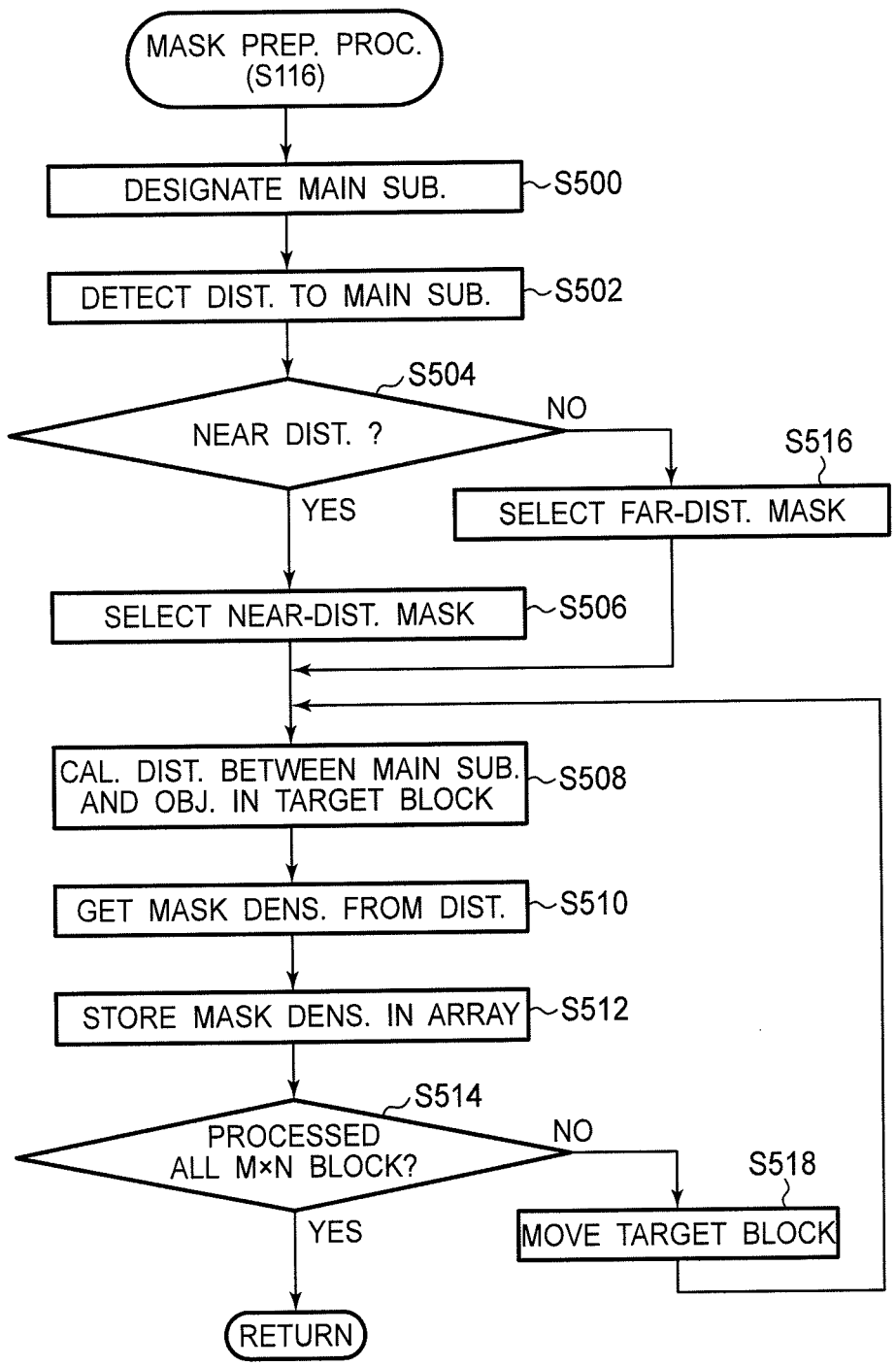
FIG. 20 is a flowchart of the mask preparation process in the second embodiment.

FIG. 20 is a flowchart of the mask preparation process in the second embodiment, which corresponds to Step S116 of FIG. 2. With reference to this flowchart, the mask preparation process in the second embodiment will be explained.

In Step S500, the main subject is designated similar to Step S300 of FIG. 8 in the first embodiment. In Step S502, the contrast map number (which corresponds to the distance) of blocks including the main subject is obtained. In Step S504, whether or not the main subject is in the near distance is determined from the distance information (the contrast map number) of the main subject. For example, whether or not the contrast map number or the distance, which corresponds to the main subject, is less than or equal to a predetermined value is determined.

When the main subject is determined to exist in the near distance at Step S504, the mask density curve for the near-distance mode, which is shown in FIG. 14, is selected in Step S506, and in Step S508 the depth-wise distance (difference) of the target block from the subject image is calculated.

On the other hand, when it is determined that the main subject is not in the near distance, thus in the far distance, the mask density curve for the far-distance mode, which is shown in FIG. 15, is selected in Step S16, and in Step S508 the distance (a difference value) of the target block from the subject image is calculated.

In Step S510, the difference value of the current target block calculated in Step S508 and the mask density curve selected in Step S506 or S516 are referenced so that the mask density value that is applied to the current target block can be determined. Further, in Step S512, the designated mask density is stored in an element of the array corresponding to the current block, which is used to create the mask.

In Step S514, whether or not the above process is carried out for all of the M*N blocks, i.e., whether or not the mask density is designated for all of the M*N blocks, is determined. When it is determined that the process has been carried out for all of the M*N blocks, this mask preparation process terminates. Otherwise, in Step S518, the target is changed to the next block and the process from Step S508 is repeated. Note that the transition of the target block is carried out in the same manner as scanning the target block in FIG. 3B and FIG. 5.

As described above, according to the second embodiment, the bokeh or blur effect is controlled depending on the distance to the main subject in the optical direction, so that an improved bokeh effect can be realized.

Incidentally, although the through-the-lens images are used to obtain the distance information in the present embodiment, the secondary images for obtaining the distance information are not limited to the through-the-lens images. Sequential images that are captured at a plurality of different focus positions during a short period of time can be also used to obtain the distance information. Further, in the present embodiment, the contrast map number is used as an example to represent the distance information. However, any variable representing the distance information is available, and further, it does not have to be proportional to the actual distance unless it has a one-to-one relationship with the distance. Further, the blurring process is also not limited to this embodiment.

The present invention may have significant advantages in a compact camera but it is not limited thereto; the inventive embodiment may also applied to a general digital single reflex camera and the like.

Further, although in the present embodiment edge contour extraction is applied to improve the precision of evaluating the contrast within each area (block), the contrast may be evaluated without using edge contour extraction if an appropriate method for evaluating the focusing conditions in each area (block) is available for the position of the lens when the image is captured.

The mask preparing process, image composition process and image storing process (Steps S116-S120 and Steps S412-S416) of the present embodiment may also be available for a device other than a digital camera, such as a personal computer and the like. In such situation, these processes are carried out with reference to the above-discussed distance map (distance information), which may be generated in the digital camera, or with reference to the distance information of the object that is obtained by an alternative method. For example, when a personal computer is used, these processes may be provided as a software program stored in a recording medium. Namely, the image data may be obtained from a recording medium or external communication and subjected to the image processing, such as the bokeh control process, with reference to distance information that is obtained from a recording medium or external communication. The resulting image may be recorded in a recording medium or transmitted to an external device.

In the present embodiment, the distance information of the object is applied to the blurring process; however, the distance information may be applied to an image process other than the blurring process. For example, it may be applied to an image process including a process for an artistic watercolor effect, a process for an illustration effect and a process for overlaying characters (including figures, symbols, letters and designs) on the image. As for the process for the artistic watercolor effect, the colors and tints may be controlled on the basis of the distance to the main subject, and/or a method for controlling the colors and tints may be changed according to the above distance. When overlaying the characters, the size of overlay areas or the size of characters may be controlled on the basis of the distance to the main subject, and/or a method for controlling the above sizes may be changed according to the above distance.

Further, the processes from the preparation of the distance map to the image processing for applying the distance information may be employed as a control program for an imaging device provided with a lens drive mechanism and an image sensor.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2011-132263 (filed on Jun. 14, 2011), which is expressly incorporated herein, by reference, in its entirety.

The invention claimed is:

1. An imaging device comprising:
an imaging processor that captures a plurality of secondary images of a same object at different in-focus positions by driving a photographing lens;
a distance information detector that detects distance information of objects captured in each area of an image based on the contrast in each of the areas in each of the secondary images;
a primary image capturing processor that, based upon distance information detected by the distance information detector, determines an in-focus position of a primary image and captures the image of the object at the determined in-focus position as a primary image; and
an image processor that carries out image processing on the primary image based on the distance information.

2. The imaging device as in claim 1, wherein the areas comprise divided block areas of the secondary images, the block areas including at least one pixel and the distance information is obtained based on the contrast in each of the block areas in each of the secondary images.

3. The imaging device as in claim 1, further comprising an edge contour extraction processor that extracts edge contour components of the secondary images and evaluates the degree of contrast based on the edge contour components within each of the areas, the distance information of each area is obtained by determining which secondary image of each area has the highest degree of contrast.

4. The imaging device as in claim 3, wherein the degree of contrast in each area is evaluated based on the sum of the edge contour components in each area.

5. The imaging device as in claim 1, wherein the secondary images comprise through-the-lens images that are captured after a photometry switch or a release switch is turned on.

6. The imaging device as in claim 1, wherein the image processing comprises a bokeh control process.

7. A method for detecting distance information comprising:
   capturing a plurality of secondary images of a same object at different in-focus positions by driving a photographing lens;
   detecting distance information of objects captured in each of areas of an image based on the contrast in each of the areas in each of the secondary images;
   determining an in-focus position of a primary image based upon the detected distance information;
   capturing an image of the object at the determined in-focus position as a primary image; and
   carrying out image processing on the primary image based on the distance information.

8. A non-transitory computer readable medium, having instructions for controlling a computer to execute a method comprising:
   capturing a plurality of secondary images of a same object at different in-focus positions by driving a photographing lens;
   detecting distance information of objects captured in each of areas of an image based on contrast in each of the areas in each of the secondary images;
   determining an in-focus position of a primary image based upon the detected distance information;
   capturing an image of the object at the determined in-focus position as a primary image; and
   carrying out image processing on the primary image based on the distance information.

9. The imaging device according to claim 1, wherein the imaging processor captures the plurality of secondary images while a lens driver drives the photographic lens between closest and furthest focusing distances.

10. The method according to claim 7, the capturing of a plurality of secondary images comprises capturing the images while the photographic lens is driven between closest and furthest focusing distances.

11. The non-transitory computer readable medium according to claim 8, the capturing of a plurality of secondary images comprises capturing the images while the photographic lens is driven between closest and furthest focusing distances.

12. The method according to claim 7, further comprising extracting edge contour components of the secondary images and evaluating the degree of contrast based on the edge contour components within each of the areas, and the distance information of each area is obtained by determining which secondary image of each area has the highest degree of contrast.

13. The non-transitory computer readable medium according to claim 8, further comprising extracting edge contour components of the secondary images and evaluating the degree of contrast based on the edge contour components within each of the areas, and the distance information of each area is obtained by determining which secondary image of each area has the highest degree of contrast.

14. The method according to claim 12, wherein the degree of contrast in each area is evaluated based on the sum of the edge contour components in each area.

15. The non-transitory computer readable medium according to claim 13, wherein the degree of contrast in each area is evaluated based on the sum of the edge contour components in each area.

16. The method according to claim 7, wherein the secondary images comprise through-the-lens images that are captured after a photometry switch or a release switch is turned on.

17. The non-transitory computer readable medium according to claim 8, wherein the secondary images comprise through-the-lens images that are captured after a photometry switch or a release switch is turned on.

18. The method according to claim 7, wherein carrying out the image processing comprises performing a bokeh control process.

19. The non-transitory computer readable medium according to claim 8, wherein carrying out the image processing comprises performing a bokeh control process.

20. The imaging device according to claim 6, wherein the bokeh processing is applied to areas other than a main subject area.

* * * * *